United States Patent [19]
Kawase et al.

[11] Patent Number: 5,631,896
[45] Date of Patent: May 20, 1997

[54] HITLESS PATH SWITCHING APPARATUS AND METHOD

[75] Inventors: Nobuyuki Kawase, Yokosuka; Yoshiaki Yamabayashi, Yokohama; Yoshihiko Uematsu, Tokyo, all of Japan

[73] Assignee: Nippon Telegraph and Telephone Corporation, Tokyo, Japan

[21] Appl. No.: 503,087

[22] Filed: Jul. 17, 1995

[30] Foreign Application Priority Data

Jul. 18, 1994 [JP] Japan ................................. 6-165573
Mar. 28, 1995 [JP] Japan ................................. 7-069997

[51] Int. Cl.$^6$ ......................................... H04L 1/22
[52] U.S. Cl. .......................... 370/228; 371/68.2; 455/8
[58] Field of Search ......................... 370/16; 371/68.1, 371/68.2, 5.1, 5.5; 455/8, 133; 340/825.01; 375/347

[56] References Cited

U.S. PATENT DOCUMENTS

| 4,246,656 | 1/1981 | Wood et al. | 455/136 |
| 4,349,914 | 9/1982 | Evans | 455/136 |
| 5,051,979 | 9/1991 | Chaudhuri et al. | 370/16 |
| 5,481,549 | 2/1996 | Conti et al. | 375/347 |

FOREIGN PATENT DOCUMENTS

| 0 585 061 | 3/1994 | European Pat. Off. . |
| 4-98917A | 3/1992 | Japan . |
| 5-344104 | 12/1993 | Japan . |
| 14048 | 1/1994 | Japan . |
| 6-120972A | 4/1994 | Japan . |
| 6-141013A | 5/1994 | Japan . |

OTHER PUBLICATIONS

"General Aspects of Digital Transmission Systems; Terminal Equipments," International Telegraph And Telephone Consultative Committee, vol. III—Facsimile III.4, 14–25 Nov. 1988, pp. 109–174.

NTT Network Systems Development Center, p. 3–235, "A Study of Hitless Switching Function on SDH Network", Kenji Gotoh et al.

NTT Network Systems Development Center, p. 3–338, "Protection System for SDH Optical Fiber Transport Module", Yukio Kobayashi et al.

N. Kawase et al, "Route diversity with hitless path switching", Electronics Letters, vol. 30, No. 23, Nov. 10, 1994, pp. 1962–1963 (Engl. & Japanese).

Kazuhiro Nishihata, "Current Status of the Trunk Transmission System and Future Development", NTT Review, vol. 5, No. 2, Mar. 1993, pp. 53–58.

Ralph Ballart et al, "Now It's the Standard Optical Network", IEEE Communications Magazine, Mar. 1989, pp. 8–15.

R. Kawamura, "A Failure–resistnat Virtual Path Scheme for ATM Networks", Technical Report of IEICE, Inst. of Electronics, Information and Communication Engineers, CS94–196, DSP94–118 (1995–01), pp. 47–54 (Engl & Japanese.

*Primary Examiner*—Benedict V. Safourek
*Attorney, Agent, or Firm*—Spencer & Frank

[57] ABSTRACT

A hitless path switching method without a bit loss. The same digital line signals on a working path and a protection path are continuously monitored independently for bit errors. If a bit error occurs in the working path and no bit error occurs in the protection path, a switching trigger is produced and a switching operation from the working path to the protection path is performed on a data block basis. Only correct data are transferred to downstream apparatuses. Reliable hitless switching is achieved not only in response to a failure in a path, but also in response to a bit error. Using data blocks of one frame length with an indicator for bit error checking placed at its beginning or top makes effective switching possible.

42 Claims, 13 Drawing Sheets

FIG. 4 (STM FRAME STRUCTURE)

FIG.5 (SDH FRAME STRUCTURE)

FIG.8 (SWITCHING METHOD ON DATA BLOCK BASIS)

HITLESS PATH SWITCHING APPARATUS AND METHOD

BACKGROUND OF THE INVENTION

1. Field of the Invention

The present invention relates to a hitless path switching apparatus and method in digital communication systems, and particularly to a hitless path switching apparatus and method suitable for SDH (Synchronous Digital Hierarchy), SONET (Synchronous Optical Network), and ATM (Asynchronous Transfer Mode) transmission systems.

2. Description of Related Art

A transmission system normally employs a redundant system which consists of one or more working systems and one protection system to establish highly reliable communications.

FIG. 1 is a block diagram showing a conventional redundant system. In this figure, a working path 3 and a protection path 4, each including a plurality of regenerative repeaters, are installed between two line terminals 1 and 2. If some failure occurs in the working path 3, the communications between the line terminals 1 and 2 can be continued by switching from the working path 3 to the protection path 4.

Switching from the working path to the protection path in such a conventional redundant system usually involves a service interruption. More specifically, actual switching processing requires a series of processings such as notification of the occurrence of a failure from the receiving end to the transmitting end, confirmation of a normally operable state of the protection system, a switching operation, and reframing of line signals through the protection path. Thus, it is inevitable that a instantaneous service interruption occurs in such redundant systems. Since the data loss due to the instantaneous interruption increases with the transmission bit rate, this presents a large problem.

FIG. 2 shows a conventional path switching apparatus proposed to solve such a problem. It is disclosed in Japanese Patent Application Laying-open No. 344104/1993 by Uematsu et al., and FIG. 2 shows a receiving side of a transmission system.

Input line signals from a working path 11 and a protection path 21 are supplied to interface circuits 13 and 23 through input ports 12 and 22, respectively. The interface circuits 13 and 23 carry out optical-to-electrical conversion and regeneration of the received line signals, and supply their outputs to signal terminating circuits 14 and 24, respectively. The signal terminating circuits 14 and 24 perform line signal termination such as frame alignment and bit error detection by using parity checking, and supply their outputs to delay circuits 15 and 25. The delay circuits 15 and 25 provide the signals with a delay time longer than that required for frame-phase matching of the two line signals. Signal-failure detecting circuits 16 and 26 are connected to the interface circuits 13 and 23, respectively, and provide a switching circuit 30 with switching control signals upon detecting an input line signal failure. The signal terminating circuits 14 and 24 also provide the switching circuit 30 with switching control signals upon detecting failure in the working path. The switching circuit 30 switches to the protection path if a failure occurs in the working path.

The path switching apparatus as shown in FIG. 2 detects a line signal failure by the signal-failure detecting circuits 16 and 26, and a bit-error by the signal terminating circuits 14 and 24. Generally speaking, it takes a considerable time to determine the occurrence of an unexpected failure and to generate the corresponding alarm because of a protection time assigned to determine a loss of frames, a loss of an optical input signal or signal degradation of an input signal. Bit errors are usually detected using a bit interleaved parity code check on a super frame, and the signal degradation is determined if the bit errors breaking a threshold are detected on some sequent super frames, the number of which is defined as the protection time. For example, if we are to detect the bit error of $10^{-6}$ on a data block, the length of a super frame should be more than $10^6$ bits, which corresponds to about 6.4 ms if the transmission bit rate is set at 155.52 Mbit/s. So the signal degradation detection also takes a considerable time.

Accordingly, a switching operation from the working path to the protection path after determining the occurance of a failure cannot prevent information data including a number of lost bits from being sent to the downstream apparatus.

SUMMARY OF THE INVENTION

Therefore an object of the present invention is to provide a hitless path switching apparatus and method that can shorten the time interval from the occurrence of a failure to the completion of switching.

The apparatus performs the working-to-protection path switching as soon as it detects an bit error on a data block of the working path, even if it does not detect alarms indicating transmission failures such as loss of a frame, loss of a signal, and so on.

Still another object of the present invention is to provide a hitless path switching apparatus and method that can reduce the amount of bit loss.

In a first aspect of the present invention, there is provided a hitless path switching apparatus which receives the same line signals incoming through a first path and a second path in the form of a stream of data blocks each including an indicator for bit error checking, and supplies one of the same line signals to a third path by hitless switching, thereby allotting one of the first path and the second path to a working path and the other to a protection path, the hitless path switching apparatus comprising:

a first signal terminating circuit connected to the first path for receiving one of the same line signals and outputting a first line signal;

a second signal terminating circuit connected to the second path for receiving the other of the same line signals and outputting a second line signal;

a first bit error detecting circuit for detecting a bit error of each the data blocks of the first line signal using the indicator for bit error checking;

a second bit error detecting circuit for detecting a bit error of each the data blocks of the second line signal using the indicator for bit error checking;

a first delay circuit for delaying the first line signal by at least one data block interval;

a second delay circuit for delaying the second line signal by at least one data block interval;

a phase difference detecting circuit for detecting a phase difference between the data block of the first line signal and the data block of the second line signal;

a phase adjusting circuit for adjusting the phase difference detected by the phase difference detecting circuit to match phases of the two data blocks, and supplying in-phase data blocks of the first line signal and of the second line signal to the first delay circuit and second delay circuit, respectively;

a switching circuit for selectively supplying the third path with one of the first line signal outputted from the first delay circuit and the second line signal outputted from the second delay circuit; and correlation monitoring circuit for supplying the switching circuit with a switching control signal to make the switching circuit supply the third path with the second line signal outputted from the second delay circuit, if the first bit error detecting circuit detects a bit error in a data block of the first line signal and the second bit error detecting circuit detects no bit error in corresponding data block of the second line signal when the first path is allotted to the working path and the second path is allotted to the protection path.

The signal terminating circuit may comprise failure detecting means for detecting a failure occurring in the first path and the second path by monitoring the line signals, and the correlation monitoring circuit may provide the switching circuit with the switching control signal to switch the second path to the working path and the first path to the protection path regardless of a bit error occurrence in the data block, if the failure is detected at the first path when the first path is allotted to the working path and the second path is allotted to the protection path.

The failure may be denoted by alarm signals such as loss of signal, loss of frame, alarm indication signal, and so on, defined in ITU-T Recommendation G. 70X and the ANSI SONET (Synchronous Optical NETwork) standard.

The indicator for bit error checking may be a B3 byte defined in ITU-T Recommendation G. 70X and the ANSI SONET standard.

The indicator for bit error checking may be a B2 byte defined in ITU-T Recommendation G. 70X and the ANSI SONET standard.

Each of the data blocks may have the indicator for bit error checking at its beginning or top.

A transferring timing of the switching control signal from the correlation monitoring circuit may be immediately after the indicator for bit error checking.

The data blocks may be VC (Virtual Container) frames defined in ITU-T Recommendation G. 70X.

Each of the data blocks may be a data block of one frame length having at its top a B3 byte defined in ITU-T Recommendation G. 70X, and the transferring timing of the switching control signal may be immediately after the B3 byte.

The data blocks may be one of an STS SPE (Synchronous Transport Signal Synchronized Payload Environment) frame, and a VT (virtual Tributary) SPE frame defined in the ANSI SONET standard.

Each of the data blocks may be a data block of one frame length having at its top a B3 byte defined in the ANSI SONET standard, and the transferring timing may be immediately after the B3 byte.

The data blocks may be an STM (Synchronous Transport Module) frame defined in ITU-T Recommendation G. 70X.

Each of the data blocks may be a data block of one frame length having at its top a B2 byte defined in ITU-T Recommendation G. 70X, and the transferring timing of the switching control signal may be immediately after the B2 byte.

The data blocks may be STS frames defined in the ANSI standard.

Each of the data blocks may be a data block of one frame length having at its top a B2 byte defined in the ANSI SONET standard, and the transferring timing of the switching control signal may be immediately after the B2 byte.

The data blocks may be ATM (Asynchronous Transfer Mode) cells defined in ITU-T Recommendation I.432.

The indicator for bit error checking may be a HEC (Header Error Control) byte in the ATM cell.

The indicator for bit error checking may be obtained by performing a bit interleave parity computation over all bits in a header area and an information area of the ATM cell.

In a second aspect of the present invention, there is provided a hitless path switching method which receives the same line signals incoming through a first path and a second path in the form of a stream of data blocks each including an indicator for bit error checking, and supplies one of the same line signals to a third path by hitless switching, thereby allotting one of the first path and the second path to a working path and the other to a protection path, said hitless path switching method comprising the steps of:

receiving one of the same line signals and outputting a first line signal;

receiving the other of the same line signals and outputting a second line signal;

detecting a bit error of each said data blocks of said first line signal using said indicator for bit error checking;

detecting a bit error of each said data blocks of said second line signal using said indicator for bit error checking;

detecting a phase difference between said data block of said first line signal and said data block of said second line signal;

adjusting the phase difference to match phases of said two data blocks, and outputting in-phase data blocks of said first line signal and of said second line signal;

delaying said first line signal by at least one data block interval;

delaying said second line signal by at least one data block interval;

selectively supplying said third path with one of said first line signal and said second line signal which have been delayed; and producing a switching control signal for supplying said third path with said second line signal which has been delayed, if a bit error is detected in a data block of said first line signal and no bit error is detected in the corresponding data block of said second line signal when said first path is allotted to said working path and said second path is allotted to said protection path.

According to the present invention, the working system and the protection system each check bit errors independently by using bit error checking methods such as a parity check or CRC (Cyclic Redundancy Check), and if a bit error occurs in the working path but not in the protection path, a switching circuit switches instantaneously to the protection path in which no bit error is detected. This makes it possible to send information data including no bit error to a downstream apparatus of the hitless path switching apparatus.

When a bit error is detected in the first data block of the working path, the corresponding information data of the data block in the protection path, which includes no bit error, is retrospectively sent. Therefore, correct data can always be transmitted to the downstream apparatus regardless of the protection time for determining the failure. This improves the bit error rate of the information data.

Moreover, placing the indicator for bit error checking of a data block at the top of the following data block makes it possible to minimize the time taken from the bit error detection to the switching operation.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

EMBODIMENT 1

Figure 1:
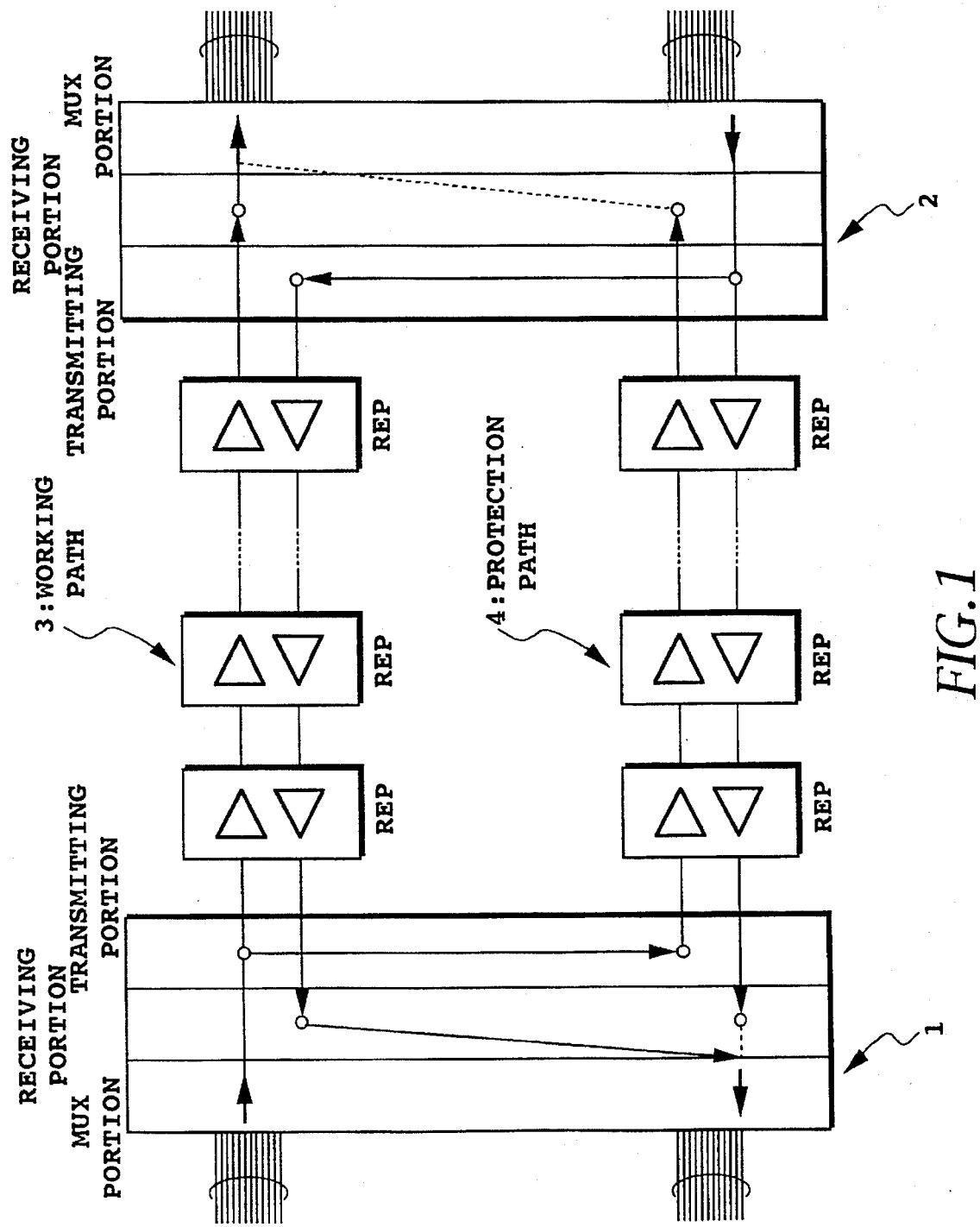
FIG. 1 is a block diagram showing a conventional configuration of a redundant system.
Figure 2:
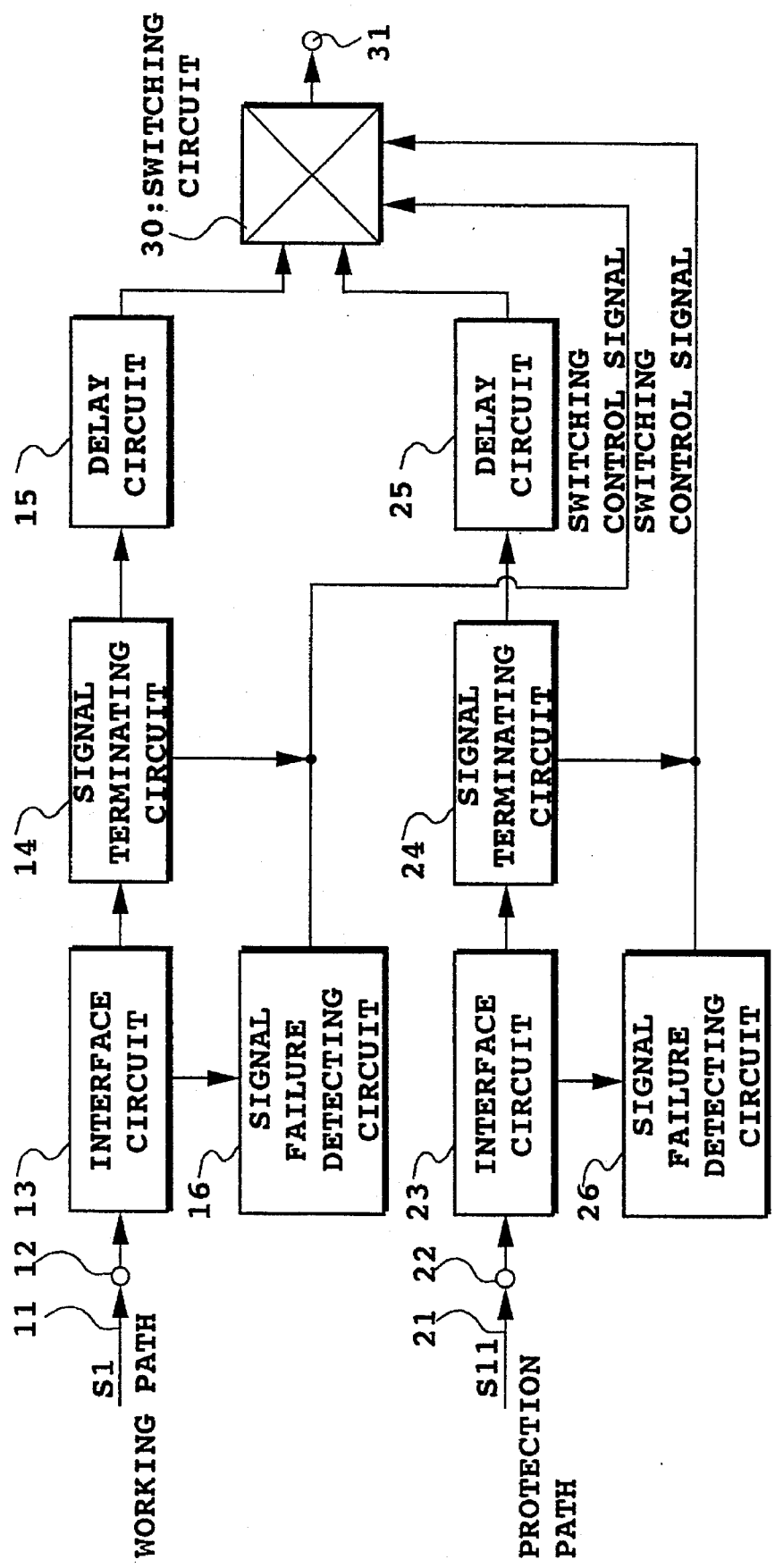
FIG. 2 is a block diagram showing a major portion of a conventional hitless path switching apparatus.
Figure 3:
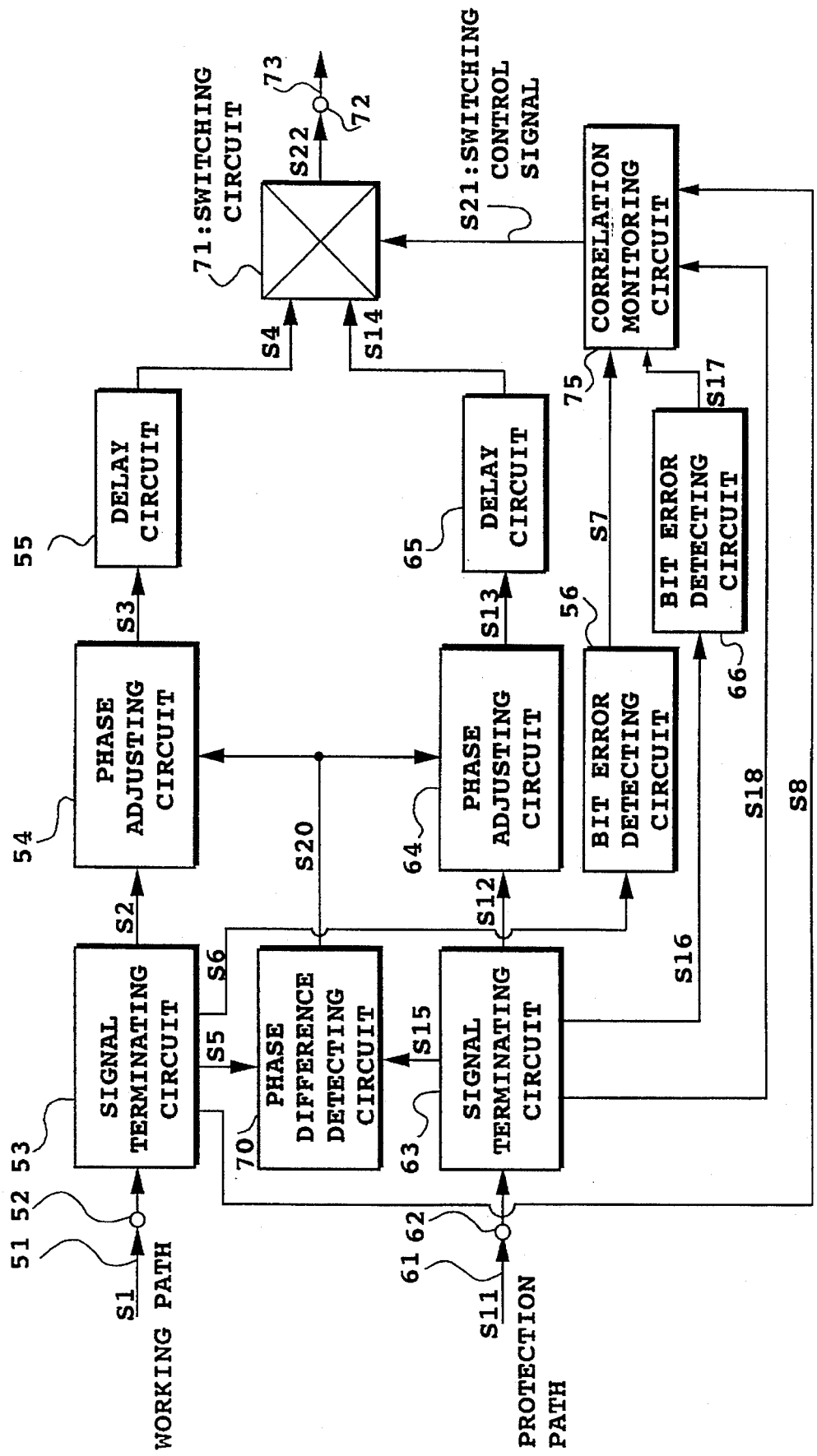
FIG. 3 is a block diagram showing a first embodiment of a hitless path switching apparatus in accordance with the present invention.

FIG. 3 is a block diagram showing a first embodiment of a hitless path switching apparatus in accordance with the present invention. This switching apparatus is a receiving portion of the line terminal. In FIG. 3, incoming line signals S1 and S11 arriving through a working path 51 and a protection path 61 are supplied to signal terminating circuits 53 and 63 through input ports 52 and 62.

Figure 4:
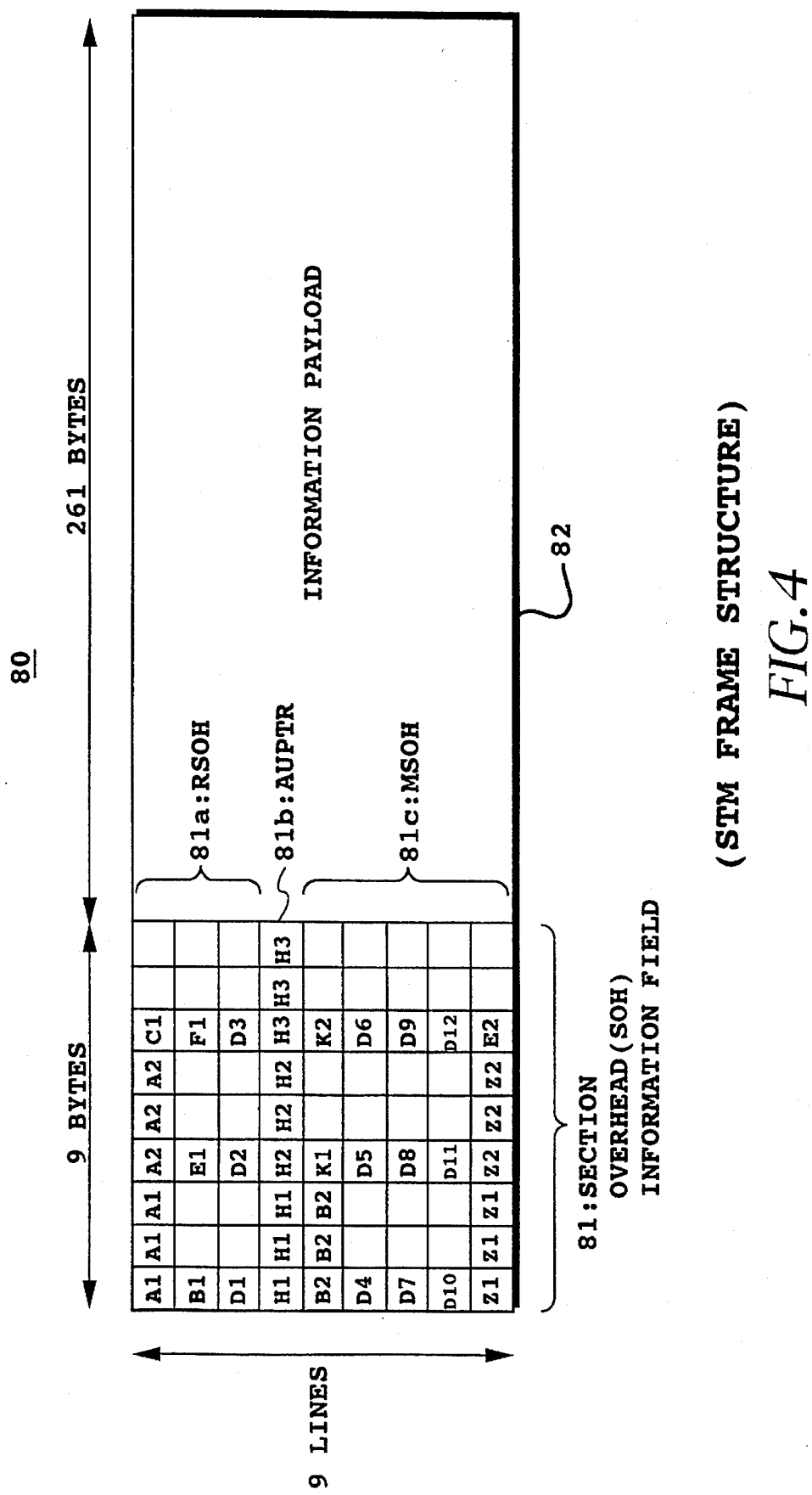
FIGS. 4 and 5 are diagrams showing the frame structure in the SDH system.
Figure 5:
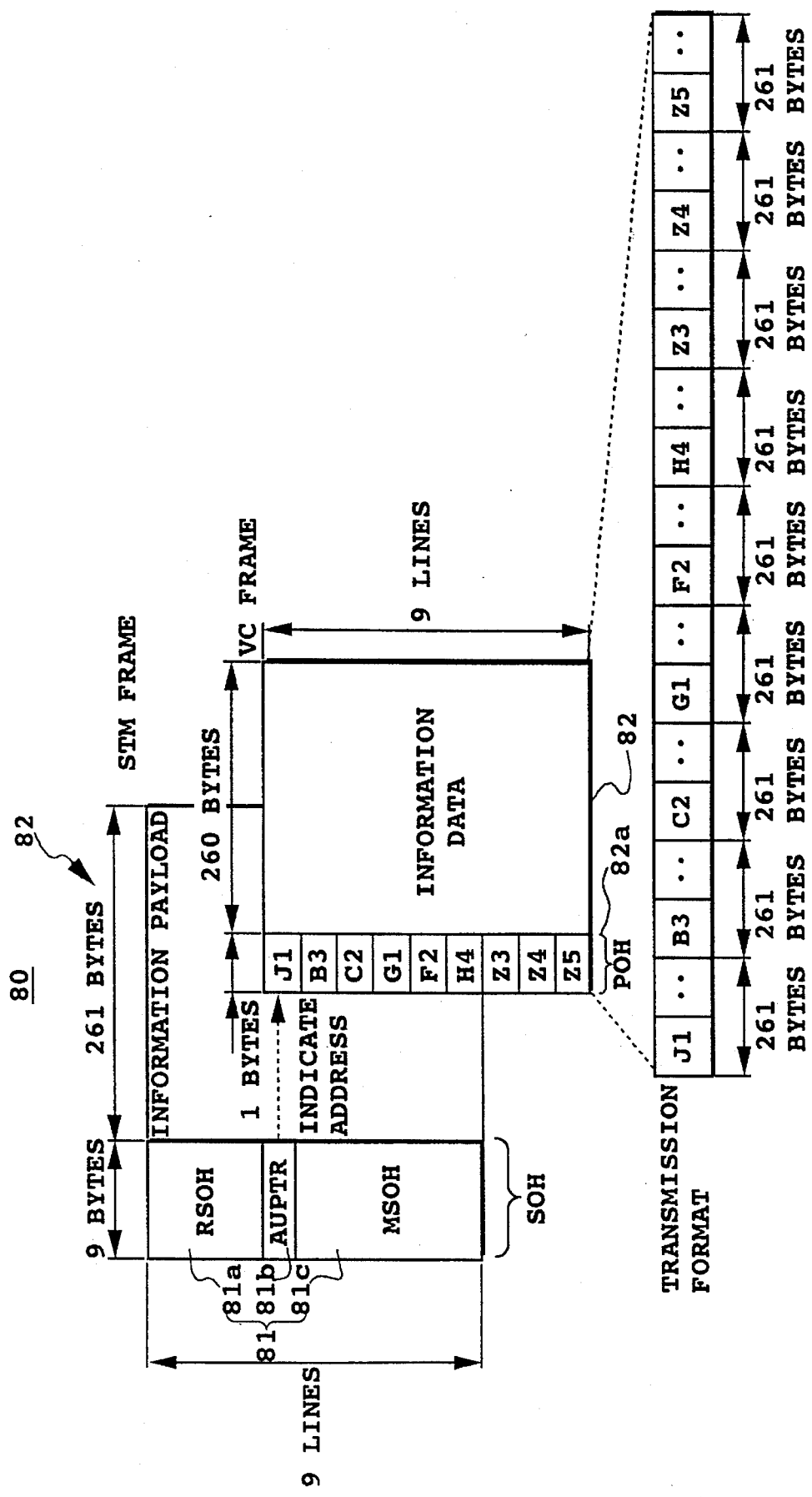

FIGS. 4 and 5 are diagrams illustrating a frame structure of the line signals S1 and S11. This frame is an STM (Synchronous Transfer Mode) frame defined in SDH (Synchronous Digital Hierarchy) in ITU-T (International Telecommunications Union-Telecommunications Standardization Sector) Recommendation, which is a counterpart of an STS frame defined in SONET (Synchronous Optical Network) in ANSI (American National Standards Institute).

In FIG. 4, an STM frame 80 (to be exact, it is an STM-1 frame, but is referred to as an STM frame below for simplicity) consists of 2,430 bytes of 270 bytes/line by 9 lines. The frame is divided into two parts: section overhead (SOH) information fields 81 for operation and maintenance consisting of 9 bytes from the beginning or top of each line, and information payload 82 consisting of the 10-th to the 270-th bytes of each line. The information payload 82 carries a VC frame (Virtual Container Frame). The SOH information field 81 is further divided into RSOH (Regenerator Section OverHead) 81a consisting of the first 9 bytes of lines 1–3, AUPTR (Administrative Unit Pointer) 81b consisting of the first 9 bytes of the 4-th line, and MSOH (Multiplex Section OverHead) 81c consisting of the first 9 bytes of lines 5–9. The AUPTR 81b consists of the H1 bytes, H2 bytes, and H3 bytes, in which H1 and H2 bytes point the beginning or top of the VC frame 82 as shown in FIG. 5. The VC frame is allowed to float. The RSOH 81a includes a B1 byte for regenerator section error monitoring, and MSOH 81c includes B2 bytes for multiplex section error monitoring, and a K1 byte and a K2 byte which will be explained later.

The first byte of each line of the VC frame 82 for accommodating the information data is POH (Path OverHead) 82a as shown in FIG. 5. The top byte thereof is a J1 byte, and a B3 byte of the second line is provided for path error monitoring. The STM frame 80 is sent from the top byte of the first line followed by the remaining bytes of the first line, and then sequentially such as the second line, third line, . . . . Accordingly, considering only the VC frame 82, excluding the SOH information field 81, it is sent sequentially on every 261 byte basis beginning from the first line whose top is the J1 byte, followed by the second line whose top is the B3 byte, . . . , and the transmission of one VC frame is completed when the 9-th line has been transmitted.

Returning to FIG. 3, the signal terminating circuits 53 and 63 receive the line signals S1 and S11 having such a frame structure, and synchronize the frame 80. More specifically, the signal terminating circuits 53 and 63 first detect the A1 and A2 bytes in the SOH information field 81 to recognize the top of the frame 80, then detect the AUPTR 81b to find the top byte J1 of the VC frame 82, which is pointed to by the H1 and H2 bytes.

The respective arriving times of the J1 bytes detected by the signal terminating circuits 53 and 63 are supplied to a phase difference detecting circuit 70 as signals S5 and S15. The phase difference detecting circuit 70 detects the phase difference between the VC frames 82 through the working and the protection paths by comparing the two J1 byte arriving times from both the paths, and supplies phase adjusting circuits 54 and 64 with a control signal S20 indicative of the phase difference. The phase difference is primarily due to the transmission length difference between the working path and the protection path.

Figure 6:
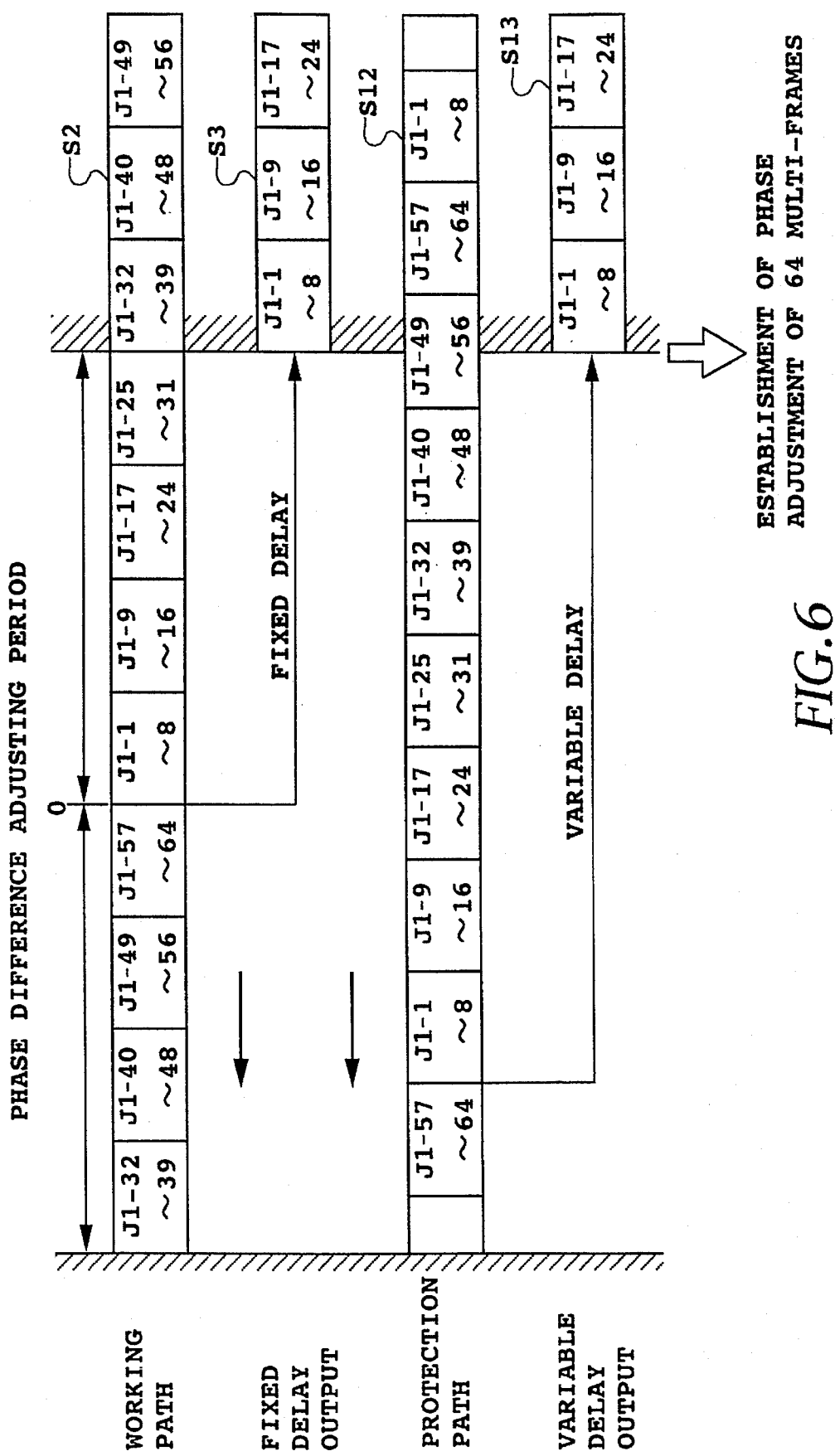
FIG. 6 is a diagram illustrating a phase adjusting operation conducted by phase adjusting circuits in FIG. 3.

FIG. 6 illustrates the phase adjusting operation of the phase adjusting circuits 54 and 64. As shown in this figure, the phase adjusting circuit 54 provides the line signal S2 supplied from the signal terminating circuit 53 with a fixed delay, and outputs a signal S3. On the other hand, the phase adjusting circuit 64 of the protection system provides the signal S12 supplied from the line signal terminating circuit 63 with a variable delay equal to the phase difference indicated by the phase difference detecting circuit 70 plus the above fixed delay, and outputs a line signal S13. Thus, the phase adjusting circuits 54 and 64 output the in-phase line signals S3 and S13, and supply the line signals to delay circuits 55 and 65, respectively. The fixed and variable delays are achieved using memories included in the phase adjusting circuits 54 and 64.

The in-phase line signals S3 and S13 are supplied to the delay circuits 55 and 65, which provide the signals S3 and S13 with a fixed delay time, and supply the delayed line signals to a switching circuit 71 as line signals S4 and S14. The fixed delay time must be set at a value greater than a time taken for a bit error check on a data block of the line signals S2 and S12.

The data stream of the VC-frame including a B3 byte, or data stream of the STM-frame including a B2 byte outputted from the signal terminating circuits 53 and 63 are supplied to bit error detecting circuits 56 and 66 as signals S6 and S16. The bit error detecting circuits 56 and 66 individually detect a bit error by using a BIP code and supply a correlation monitoring circuit 75 with the error detection results as control signals S7 and S17. Alarm signals such as loss of frame, loss of signal, and so on, outputted from the signal terminating circuits 53 and 63, are supplied to the correlation monitoring circuit 75 as control signals S8 and S18.

The signal terminating circuits 53 and 63 generate these alarm signals by watching some SOH bytes for a defined protection time. Next, the functions of these bytes in the SDH will be described below.

(1) H1 and H2 bytes

In ITU-T Recommendation G.70X, it is ruled that the H1 and H2 bytes point the top byte of the VC frame. In addition, it is ruled that all the bits of the H1 and H2 bytes are set to "1" as an AIS (Alarm Indication Signal) that informs downstream apparatuses of an upstream failure. In other words, the H1 and H2 bytes with all their bits set at "1" indicate that some failure has occurred upstream somewhere.

(2) B2 and B3 bytes

In ITU-T Recommendation G.70X, it is ruled that the B2 bytes are allocated in the MSOH 81c for parity checking of the STM frame 80, and that the BIP codes are computed over all bits of the preceding STM frame except for the RSOH 81a.

In ITU-T Recommendation G.70X, it is stated that the B3 byte is allocated in the POH 82a of the VC frame, and that the BIP codes are calculated over all bits of the previous VC frame.

These parity checks are obtained by bit interleave parity computation. With regard to the B3 byte, for example, the transmission end divides all the bytes in a VC frame into 8 portions from the first bit to the 8-th bit, and performs the parity check computation independently for each division, and writes the results into the B3 byte of the following frame. In connection with this, the receiving end performs the same parity check computation as the transmission end, and compares the computation results with the B3 byte of the following frame to detect bit errors.

(3) K2 byte

In ITU-T Recommendation G.70X, it is ruled that the 6–8th bits of the K2 byte are set at "1" as AIS to be sent downstream as an indication that an upstream failure has been detected and an alarm has been generated. In other words, all "1"s in bits 6, 7 and 8 of the K2 byte indicates that some upstream failure has occurred.

The correlation monitoring circuit 75 determines whether the switching between the working path and the protection path should be carried out on the basis of the control signals S7, S17, S8 and S18, and supplies the switching circuit 71 with a switching control signal S21.

The switching circuit 71 is a hitless switching circuit capable of achieving switching within a bit interval, and selectively transmits through an output port 72 one of the line signals S4 and S14 from the delay circuits 55 and 65 to a path 73 as a line signal S22.

Figure 7:
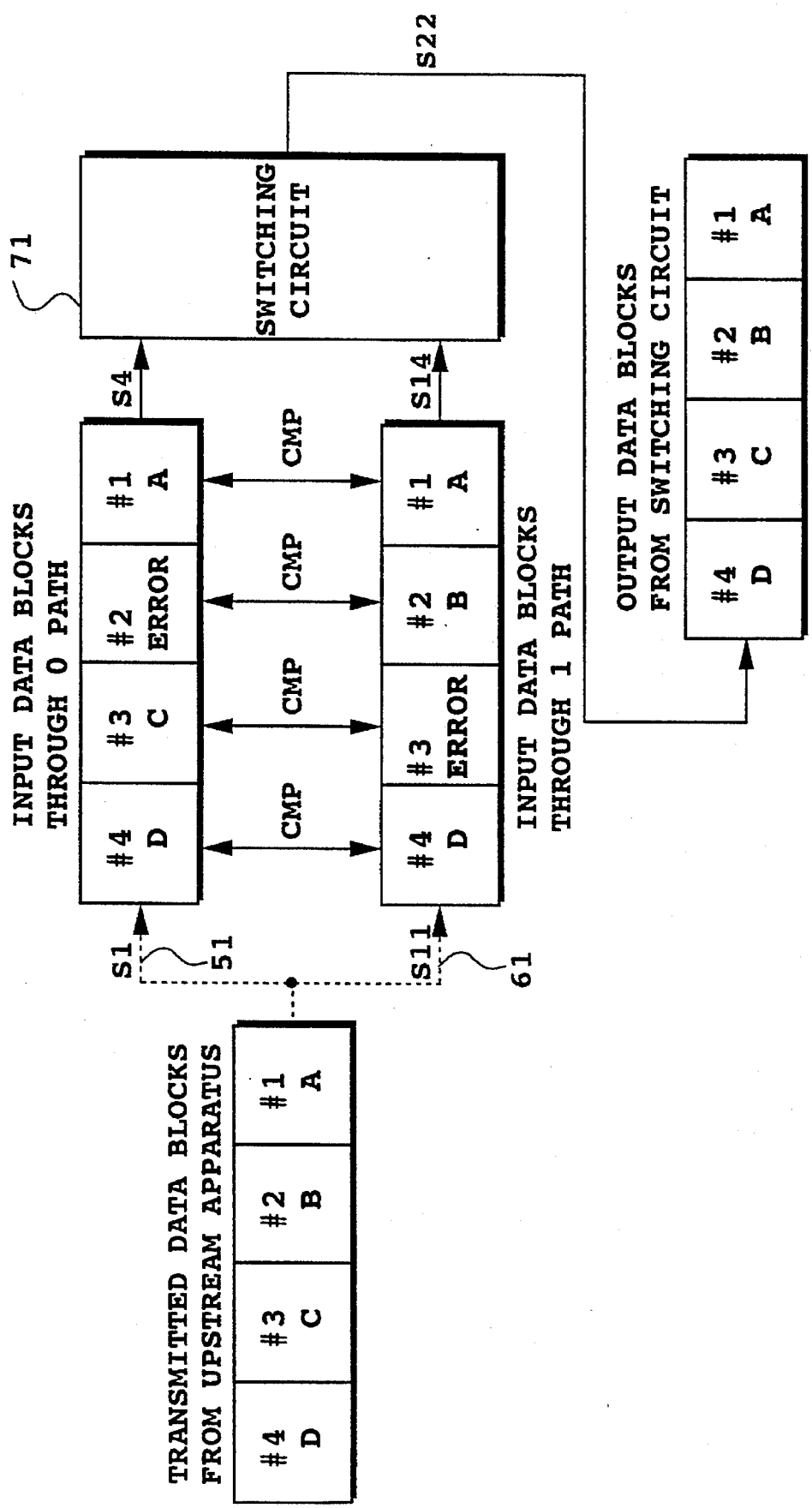
FIG. 7 is a schematic diagram illustrating the principle of the switching operation triggered by bit error detection.

FIG. 7 is a diagram schematically illustrating the operation of the switching circuit 71 on the basis of the bit error detection. Data blocks are provided with data block numbers such as #1, #2, #3 and #4, and hence the same data blocks can be identified regardless of the phase difference between the working path and the protection path. These data blocks contain information A, B, C and D, respectively.

The signals S1 and S11 sent from the upstream are introduced to a 0-path (the working path in FIG. 3) and a 1-path (the protection path in FIG. 3), respectively. The bit error detection using parity checking or CRC is performed on a the 0-path and 1-path, respectively. Let us assume that a bit error is detected in the #2 data block in the 0-path, and in the #3 data block in the 1-path. In this case, the switching circuit 71 outputs the #1 data block of the 0-path first, and then the #2 data block of the 1-path, followed by the output of the #3 data block of the 0-path, and the #4 data block of the 0-path. This means that the switching circuit 71 adopts the 0-, 1-, 0- and 0- paths as the working path for the passage of the data block #1–#4, thereby sending correct data blocks downstream.

Figure 8:
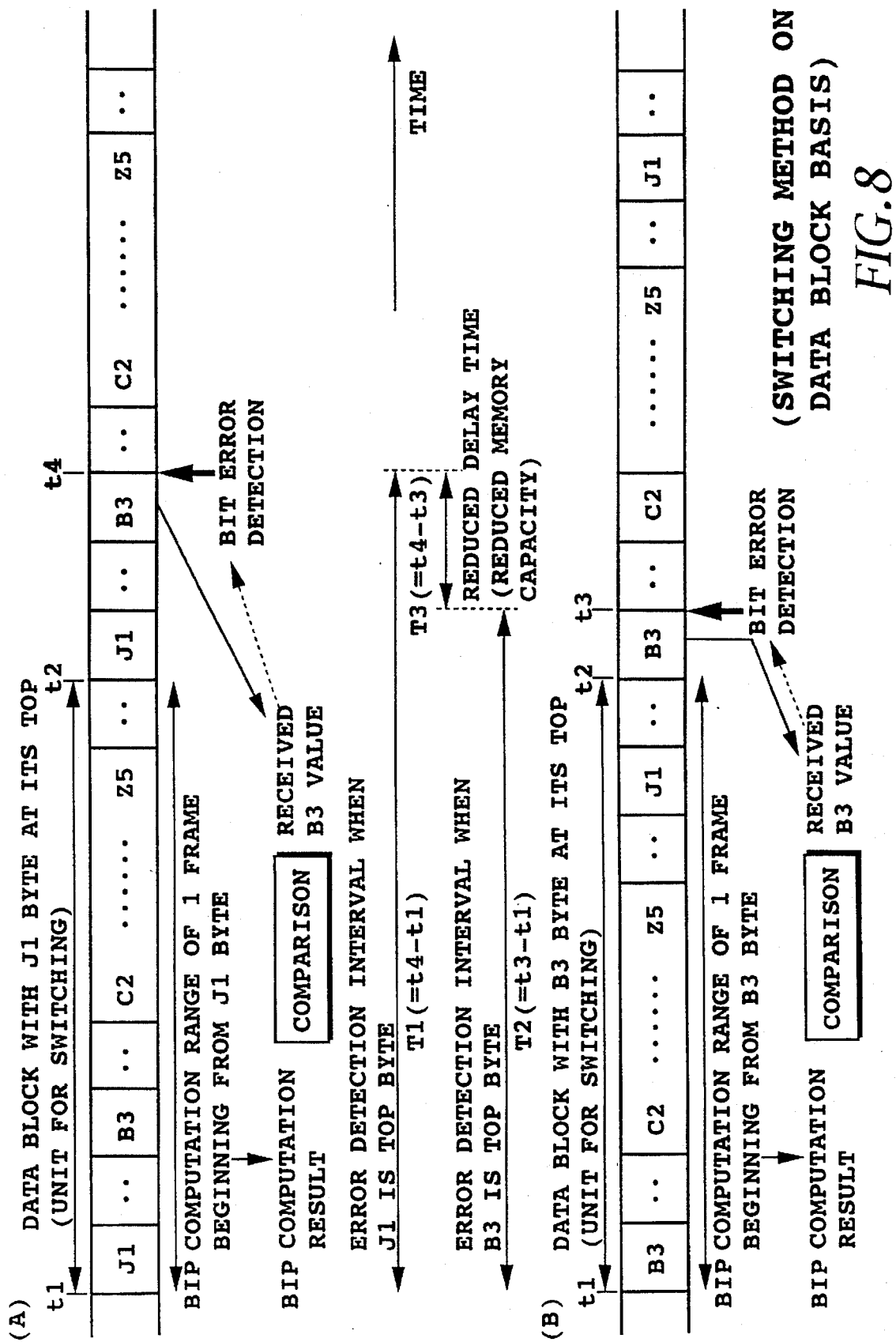
FIG. 8 is a diagram illustrating an actual switching operation of the first embodiment triggered by bit error detection.

FIG. 8 is a diagram illustrating actual switching operations of the embodiment based on the bit error detection. FIG. 8(A) shows a switching method performed on the data block basis of one VC frame length, with the J1 byte placed at the top, and FIG. 8(B) shows a switching method performed on the data block basis of one VC frame length, with the B3 byte placed at the top.

As described above, in the receiving end, bit errors are detected by comparing the B3 byte with the computed parity over all the bits of the VC frame immediately preceding the current VC frame. Accordingly, the bit error occurrence in the preceding frame is determined at time t4 of FIG. 8(A), that is, at the end of the latest B3 byte. In this case, the bit error detecting circuits 56 and 66 in FIG. 3 carry out the parity check calculation over all the bits from the first bit of the J1 byte of the preceding frame to the bit immediately before the J1 byte of the current frame, and compare the results with the latest B3 byte to detect bit errors. Consequently, when the J1 byte is set to be the top of a data block, it takes a time interval of T1 (=t4−t1) to detect a bit error.

On the other hand, a switching based on the data block whose top is the B3 byte as shown in FIG. 8(B) makes it possible to detect a bit error more quickly. As is clearly shown in FIG. 8(B), the bit error detection time interval in this case is T2 (t3−t1). Since the time t3 is earlier than the time t4 by the amount of one line (260 bytes) of the VC frame, the delay time of the delay circuits 55 and 65 in FIG. 3 can be shortened by that amount T3 (=T1−T2=t4−t3). The shortened delay time corresponding to one line of the VC frame results in a reduction in the memory capacity required for providing the delay time. That is, the method shown in FIG. 8(B) can not only shorten the delay time, but also reduce the memory capacity by an amount corresponding to one line of the VC frame, compared with the method shown in FIG. 8(A). A similar effect can also be obtained with the STM frame.

Figure 9:
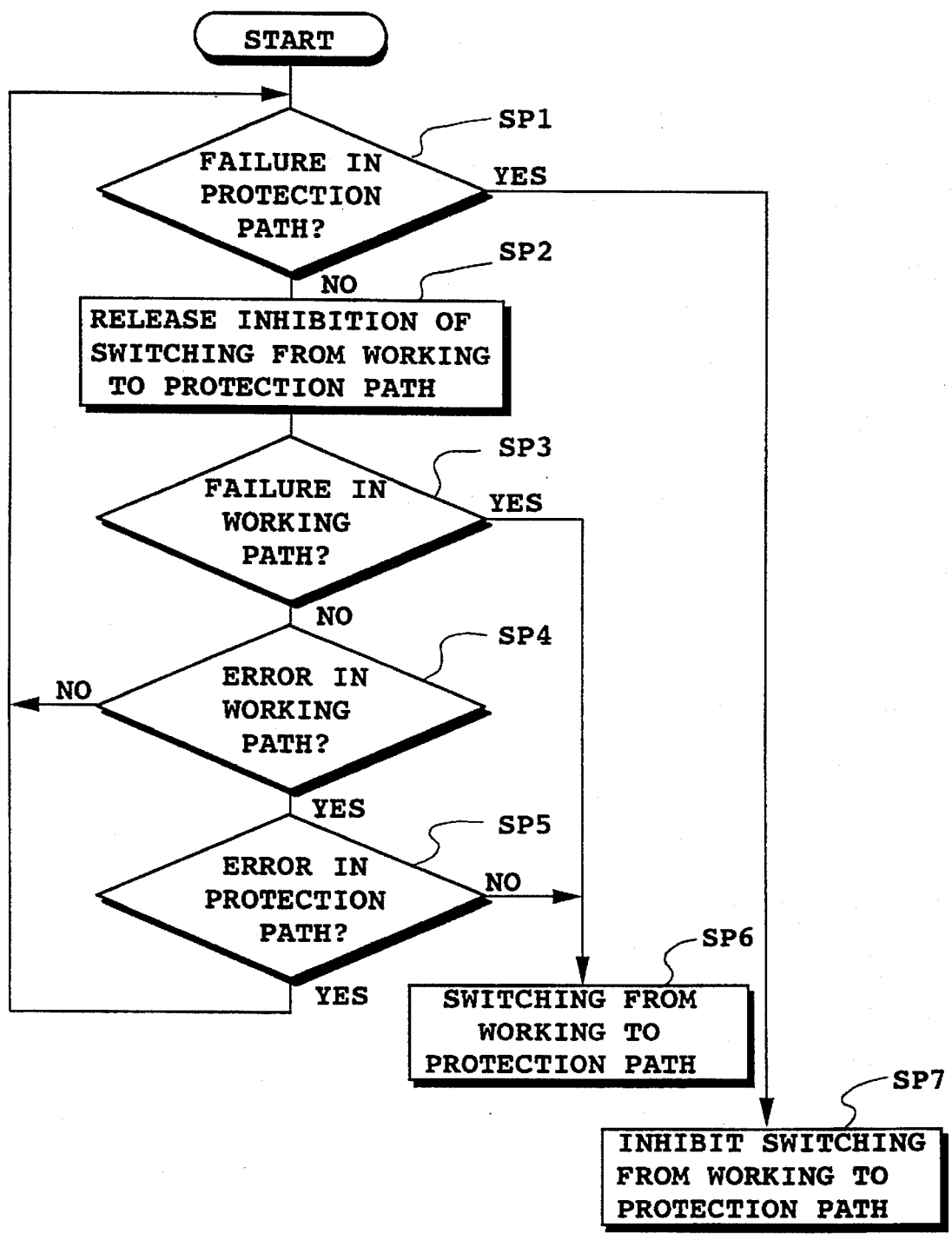
FIG. 9 is a flowchart showing the principle of the switching procedure.

FIG. 9 is a flowchart showing the operation of the correlation monitoring circuit 75 in FIG. 3. The correlation monitoring circuit 75 performs switching considering both a failure and a bit error. Here, the failure refers to alarm signals such as loss of signal, loss of frame, AIS, and so on. The alarm signal is generally more reliable than a bit error detection because the failure is declared when detecting interruption of an optical input by a photo detector for a protection time, or confirming the loss of synchronization for a protection time. Thus, a failure takes precedence over a bit error in this switching scheme. FIG. 9 shows the principle of such a switching control.

If a failure is detected in the protection path at step SP1 of FIG. 9, switching from the working path to the protection path is inhibited at step SP7. If no failure is detected in the protection path, an inhibition of switching from the working path to the protection path, if it has been set previously, is released at step SP2. If a failure is detected in the working path at step SP3 but not in the protection path, switching is performed from the working path to the protection path at step SP6.

When no failure is detected in the working path as well as in the protection path, the bit error occurrence in the working path is checked at step SP4, and returns to step SP1 if no bit error is detected. If a bit error is detected in the working path, the bit error occurrence is checked in the protection path. If no bit error is detected in the protection path, a switching operation is carried out from the working path to the protection path at step SP6. That is, the switching from the working path to the protection path is carried out if a bit error occurs in the working path but not in the protection path. If a bit error is also detected in the protection path at step SP5, the processing returns to step SP1 without switching the paths.

Figure 10:
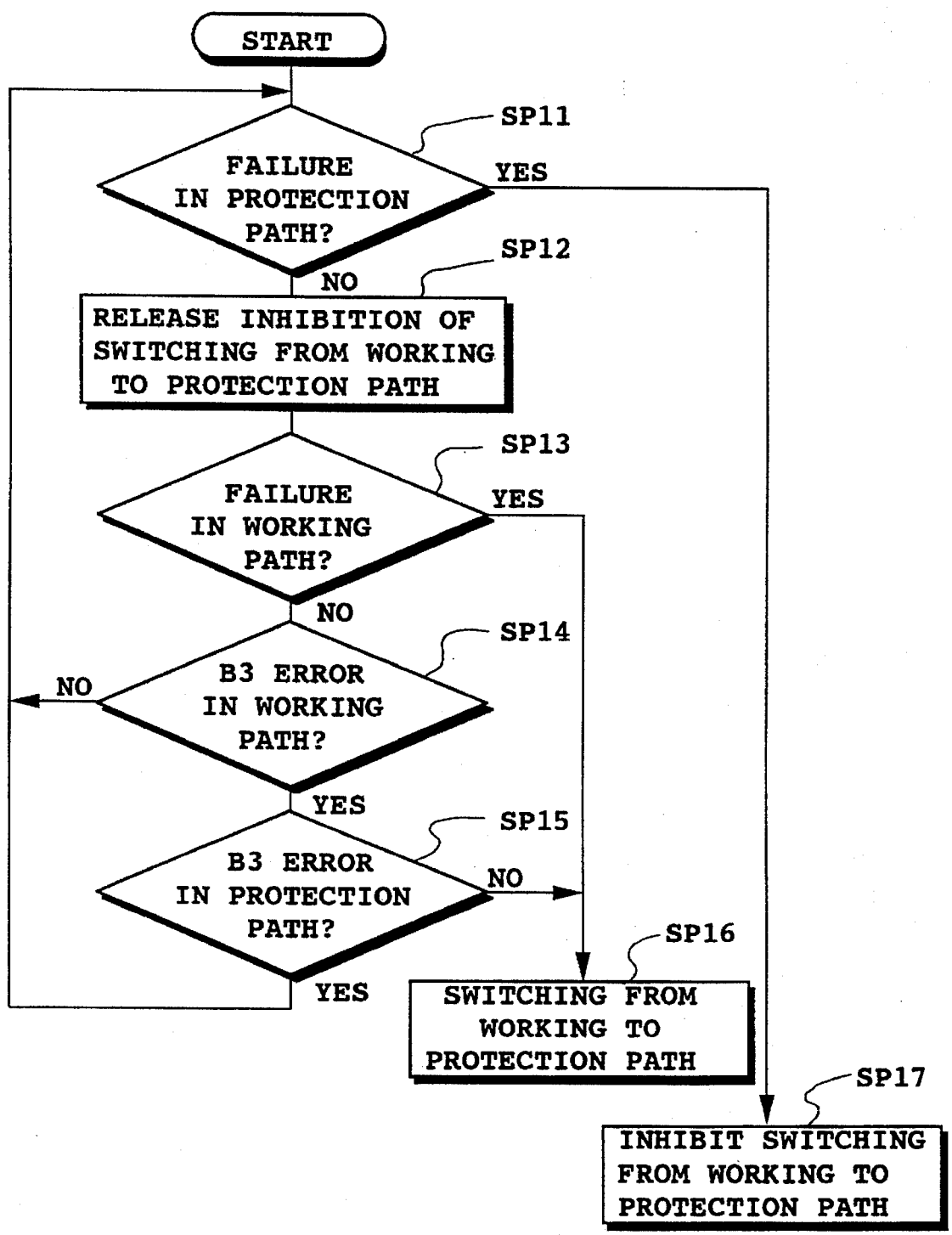
FIG. 10 is a flowchart showing the switching procedure based on a VC frame in the SDH system, a VT SPE frame and an STS SPE frame in the SONET system.

FIG. 10 is a flowchart showing the switching operation when a bit error is detected using the B3 byte. In this case, a data block corresponds to a VC frame. Since the operation shown by the flowchart is clear by comparing FIG. 10 with FIG. 9, the explanation thereof is omitted here.

Figure 11:
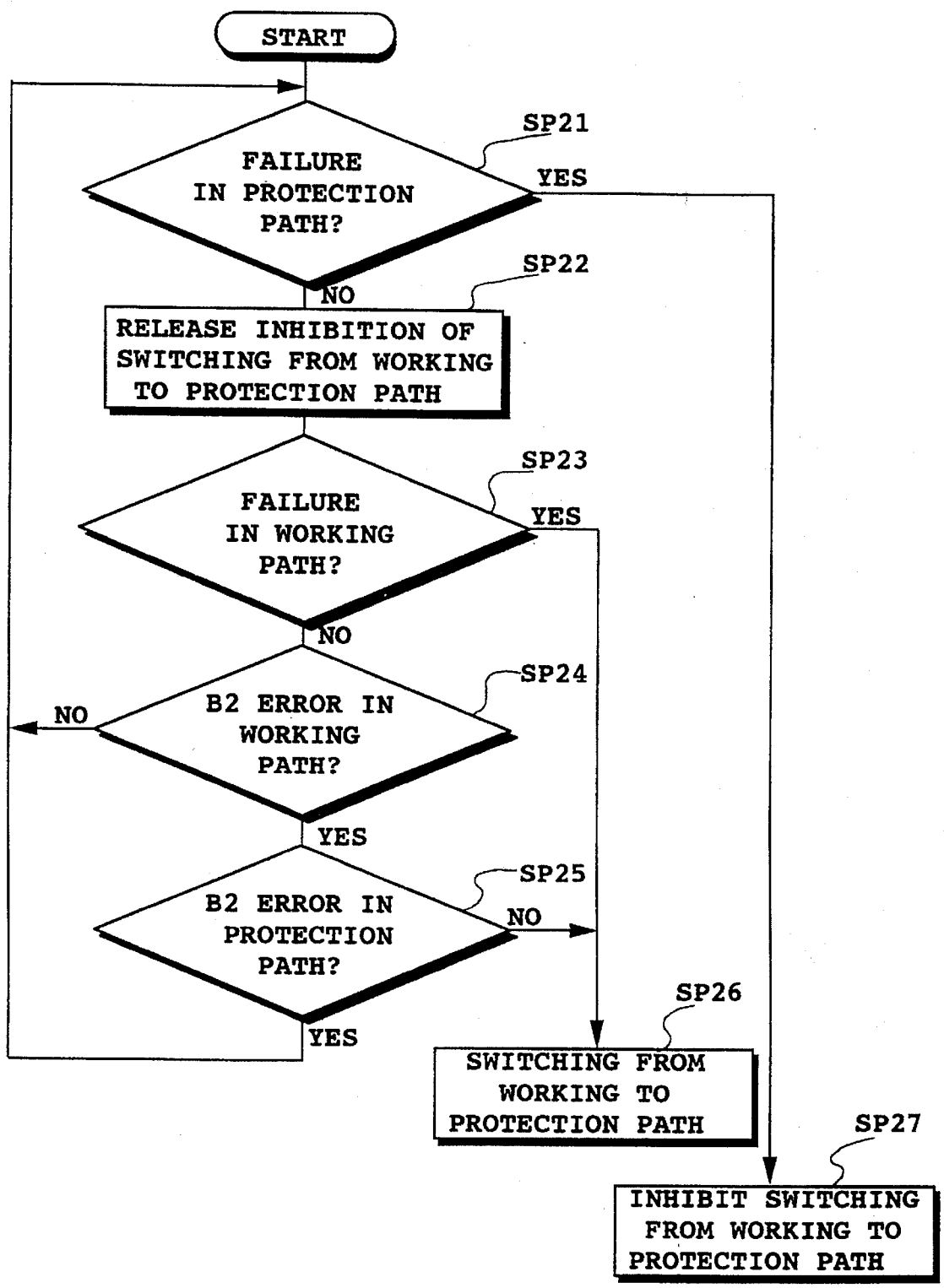
FIG. 11 is a flowchart showing the switching procedure based on an STM frame in the SDH system or an STS frame in the SONET system.

FIG. 11 is a flowchart showing the switching operation when a bit error is detected using the B2 byte. In this case, a data block corresponds to an STM frame. Since the operation shown by the flowchart is also clear by comparing FIG. 11 with FIG. 9, the explanation thereof is omitted here.

EMBODIMENT 2

Figure 12:
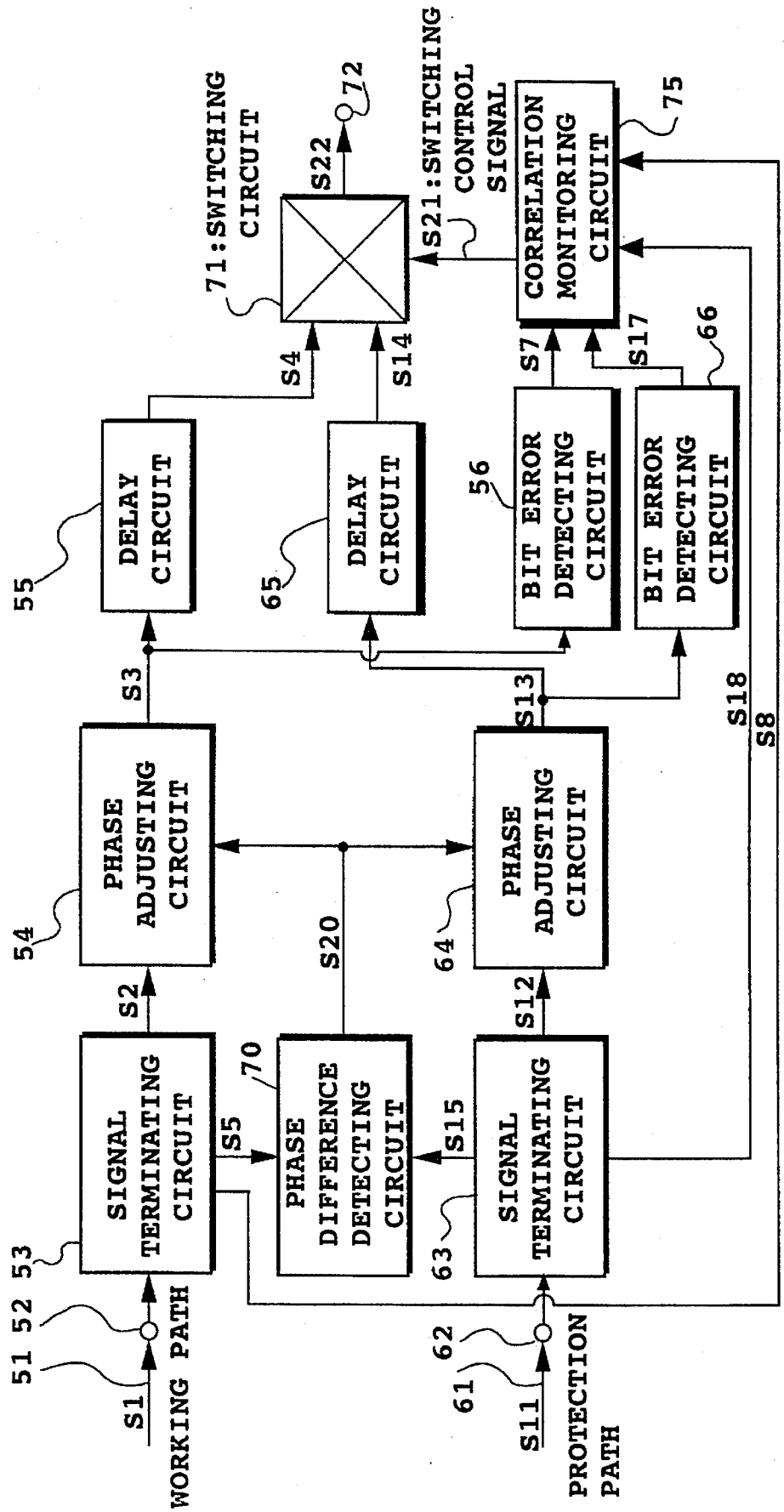
FIG. 12 is a block diagram showing a second embodiment of a hitless path switching apparatus in accordance with the present invention.

FIG. 12 is a block diagram showing a second embodiment of a hitless path switching apparatus in accordance with the present invention. The second embodiment differs from the first embodiment in the following:

(1) The signal feed lines from the signal terminating circuits 53 and 63 to the bit error detecting circuits 56 and 66 are removed.

(2) The phase adjusted signals S3 and S13 are supplied from the phase adjusting circuits 54 and 64 to the bit error detecting circuits 56 and 66. This is for detecting a bit error after matching the phases of the received line signals of the two paths.

Such an configuration results in effects and advantages similar to those of the first embodiment. More specifically, the information data of the first data block in the protection path, which includes no bit error, is retrospectively sent when a bit error is detected in the first data block of the working path. Therefore, correct data can always be transmitted to the downstream apparatus regardless of the protection time for determining the failure. This improves the bit error rate of the information data that is sent downstream.

In addition, the hitless path switching apparatus in accordance with the present invention can always select correct frames as long as both the working path and the protection path do not detect a bit error simultaneously. As a result, an extremely highly reliable path can be implemented. For example, assuming that the path error rate of each VC frame of the working and protection paths is $1 \times 10^{-11}$, the probability that bit errors of the VC frames of the two paths will occur simultaneously is $3.53 \times 10^{-14}$, which means that a reliable path can be implemented in which a bit error occurs only once per 112 years.

Although the present invention is applied to SDH of ITU-T in the first and second embodiments described above, it can be applied to SONET (Synchronous Optical Network) of ANSI, as well. Major equivalent items in the SDH and SONET are as follows:

| SDH LEVEL | SONET LEVEL |
|---|---|
| STM-1 | STS-3 |
| VC-4 | STS-3C SPE |
| VC-21 | VT-6 SPE |
| RSOH | Section Overhead |
| MSOH | Line Overhead |
| POH | Path Layer Overhead |
| H1, H2 | H1, H2 |
| B2 | B2 |
| K1, K2 | K1, K2 |
| J1 | J1 |
| B3 | B3 |

NOTE: SPE = Synchronized Payload Environment

Using the equivalence allows the present invention to be applied to the SONET frame, and this leads to effects and advantages similar to those of the first and second embodiments.

In addition, instead of the STS frame defined in ANSI, a VT (Virtual Tributary) SPE frame or an STS SPE frame defined in ANSI can also be used.

EMBODIMENT 3

Figure 13:
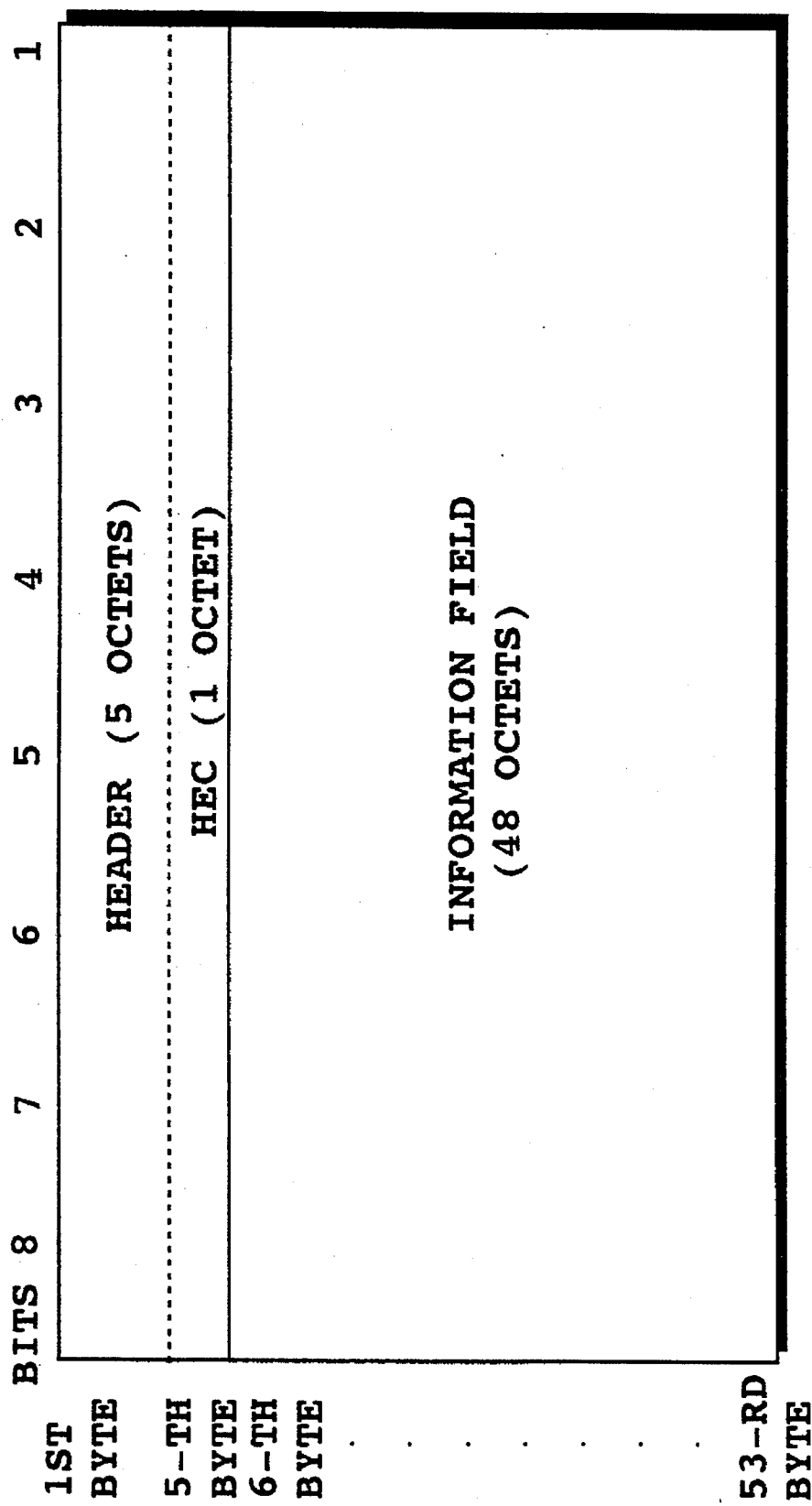
FIG. 13 is a diagram showing the structure of an ATM (Asynchronous Transfer Mode) cell used in an embodiment in which a hitless path switching apparatus in accordance with the present invention is applied to the ATM.

FIG. 13 illustrates the structure of an ATM cell used in an embodiment of a hitless path switching apparatus in accordance with the present invention applied to ATM (Asynchronous Transfer Mode).

ITU-T Recommendation I.432 describes the error correction and error detection functions using an HEC (Header Error Control) byte in the ATM network. As shown in FIG. 13 ATM carries out data transmission using a 53-byte cell as a data block, that is, as the transmission unit. The top five bytes of the cell are called a header, and contain a destination address of the cell, and other control information. The remaining 48-bytes are an information field containing service information.

Since each cell includes a destination address in ATM, a bit error in the header will lead to a wrong cell destination, which will hinder correct transmission. Thus, the HEC byte is disposed at the fifth byte, and the transmission end computes a CRC for block check over the four bytes in the header except for the HEC byte, and stores the resultant CRC code in the HEC byte. CRC calculation using the HEC byte is performed at the receiving end to detect and correct a bit error in the header.

Thus, using this function makes it possible to perform switching between a working path and a protection bath as in the above-mentioned embodiments using bit error detection. Since the bit error detection using the HEC byte has an automatic 1-bit error correcting function, the switching between the paths only needs to be performed if two or more bit errors occur, in which case self-correction is impossible and it is recognized that a bit error occurs in the header.

In addition, bit interleaved parity computation can be performed over all the bytes in the header area and the information area of the ATM cell, and the computation result can be used for bit error checking by writing the result in the header.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A hitless path switching apparatus which receives substantially the same line signals incoming through a first path and a second path in the form of a stream of data blocks each including an indicator for bit error checking, and supplies one of the line signals to a third path by hitless switching, thereby allotting one of the first path and the second path to a working path and the other to a protection path, said hitless path switching apparatus comprising:

a first signal terminating circuit connected to said first path for receiving one of the substantially the same line signals and outputting a first line signal;

a second signal terminating circuit connected to said second path for receiving the other of the substantially the same line signals and outputting a second line signal;

a first bit error detecting circuit for detecting a bit error of each data block of said first line signal using said indicator for bit error checking;

a second bit error detecting circuit for detecting a bit error of each data block of said second line signal using said indicator for bit error checking;

a first delay circuit for delaying said first line signal by at least one data block interval;

a second delay circuit for delaying said second line signal by at least one data block interval;

a phase difference detecting circuit for detecting a phase difference between said first line signal and said second line signal;

a phase adjusting circuit for adjusting the phase difference detected by said phase difference detecting circuit to match phases of said two line signals, and supplying in-phase data blocks of said first line signal and of said second line signal to said first delay circuit and said second delay circuit, respectively;

a switching circuit for selectively supplying said third path with one of said first line signal outputted from said first delay circuit and said second line signal outputted from said second delay circuit; and a correlation monitoring circuit for supplying said switching circuit with a switching control signal to make said switching circuit supply said third path with said second line signal outputted from said second delay circuit, if said first bit error detecting circuit detects a bit error in a data block of said first line signal and said second bit error detecting circuit detects no bit error in a corresponding data block of said second line signal when said first path is allotted to said working path and said second path is allotted to said protection path.

2. The hitless path switching apparatus as claimed in claim 1, wherein said signal terminating circuits comprise failure detecting means for detecting a failure occurring in said first path and said second path by monitoring said line signals, and said correlation monitoring circuit provides said switching circuit with said switching control signal to switch said second path to said working path and said first path to said protection path regardless of a bit error occurrence, if a failure is detected at said first path when said first path is allotted to said working path and said second path is allotted to said protection path.

3. The hitless path switching apparatus as claimed in claim 2, wherein said failure is denoted by an alarm signal selected from a group which includes a signal indicating a loss of signal, a signal indicating a loss of frame, and an alarm indication signal, defined in ITU-T Recommendation G. 70X and the ANSI SONET (Synchronous Optical NETwork) standard.

4. The hitless path switching apparatus as claimed in claim 3, wherein said indicator for bit error checking is a B3 byte defined in ITU-T Recommendation G. 70X and the ANSI SONET standard.

5. The hitless path switching apparatus as claimed in claim 3, wherein said indicator for bit error checking is a B2 byte defined in ITU-T Recommendation G. 70X and the ANSI SONET standard.

6. The hitless path switching apparatus as claimed in claim 1, wherein each of said data blocks has said indicator for bit error checking at its beginning portion.

7. The hitless path switching apparatus as claimed in claim 6, wherein a transferring timing of said switching control signal from said correlation monitoring circuit is immediately after said indicator for bit error checking.

8. The hitless path switching apparatus as claimed in claim 7, wherein said signal terminating circuits comprise failure detecting means for detecting a failure occurring in said first path and said second path by monitoring said line signals, wherein said correlation monitoring circuit provides said switching circuit with said switching control signal to switch said second path to said working path and said first path to said protection path regardless of a bit error occurrence, if a failure is detected at said first path when said first path is allotted to said working path and said second path is allotted to said protection path, and wherein said failure is denoted by an alarm signal selected from a group which includes a signal indicating a loss of signal, a signal indicating a loss of frame, and an alarm indication signal, defined in ITU-T Recommendation G. 70X and the ANSI SONET (Synchronous Optical NETwork) standard.

9. The hitless path switching apparatus as claimed in claim 8, wherein said indicator for bit error checking is a B3 byte defined in ITU-T Recommendation G. 70X and the ANSI SONET standard.

10. The hitless path switching apparatus as claimed in claim 8, wherein said indicator for bit error checking is a B2 byte defined in ITU-T Recommendation G. 70X and the ANSI SONET standard.

11. The hitless path switching apparatus as claimed in claim 1, wherein said data blocks are VC (Virtual Container) frames defined in ITU-T Recommendation G. 70X.

12. The hitless path switching apparatus as claimed in claim 11, wherein each of said data blocks is a data block of one frame length having at its beginning portion a B3 byte defined in ITU-T Recommendation G. 70X, and a transferring timing of said switching control signal is immediately after said B3 byte.

13. The hitless path switching apparatus as claimed in claim 1, wherein said data blocks are one of STS SPE (Synchronous Transport Signal Synchronized Payload Environment) frames, and VT (Virtual Tributary) SPE frames defined in the ANSI SONET standard.

14. The hitless path switching apparatus as claimed in claim 13, wherein each of said data blocks is a data block of one frame length having at its beginning portion a B3 byte defined in the ANSI SONET standard, and said transferring timing is immediately after said B3 byte.

15. The hitless path switching apparatus as claimed in claim 1, wherein said data blocks are STM (Synchronous Transport Module) frames defined in ITU-T Recommendation G. 70X.

16. The hitless path switching apparatus as claimed in claim 15, wherein each of said data blocks is a data block of one frame length having at its beginning portion a B2 byte defined in ITU-T Recommendation G. 70X, and a transferring timing of said switching control signal is immediately after said B2 byte.

17. The hitless path switching apparatus as claimed in claim 1, wherein said data blocks are STS frames defined in the ANSI standard.

18. The hitless path switching apparatus as claimed in claim 17, wherein each of said data blocks is a data block of one frame length having at its beginning portion a B2 byte defined in the ANSI SONET standard, and a transferring timing of said switching control signal is immediately after said B2 byte.

19. The hitless path switching apparatus as claimed in claim 1, wherein said data blocks are ATM (Asynchronous Transfer Mode) cells defined in ITU-T Recommendation I. 432.

20. The hitless path switching apparatus as claimed in claim 19, wherein said indicator for bit error checking is a HEC (Header Error Control) byte in said ATM cell.

21. The hitless path switching apparatus as claimed in claim 19, wherein said indicator for bit error checking is obtained by performing bit interleave parity computation over all bits in a header area and an information area of said ATM cell.

22. A hitless path switching method which receives substantially the same line signals incoming through a first path and a second path in the form of a stream of data blocks each including an indicator for bit error checking, and supplies one of the line signals to a third path by hitless switching, thereby allotting one of the first path and the second path to a working path and the other to a protection path, said hitless path switching method comprising the steps of:

receiving one of the substantially the same line signals and outputting a first line signal;

receiving the other of the substantially the same line signals and outputting a second line signal;

detecting a bit error of each data block of said first line signal using said indicator for bit error checking;

detecting a bit error of each data block of said second line signal using said indicator for bit error checking;

detecting a phase difference between said first line signal and said second line signal;

adjusting the phase difference to match phases of said two line signals, and outputting in-phase data blocks of said first line signal and of said second line signal;

delaying said first line signal by at least one data block interval;

delaying said second line signal by at least one data block interval;

selectively supplying said third path with one of said first line signal and said second line signal which have been delayed; and producing a switching control signal for supplying said third path with said second line signal which has been delayed, if a bit error is detected in a data block of said first line signal and no bit error is detected in a corresponding data block of said second line signal when said first path is allotted to said working path and said second path is allotted to said protection path.

23. The hitless path switching method as claimed in claim 22, further comprising the steps of detecting a failure occurring in said first path and said second path by monitoring said line signals, and switching said second path to said working path and said first path to said protection path regardless of a bit error occurrence, if a failure is detected at said first path when said first path is allotted to said working path and said second path is allotted to said protection path.

24. The hitless path switching method as claimed in claim 23, wherein said failure is denoted by an alarm signal selected from a group which includes a signal indicating a loss of signal, a signal indicating a loss of frame, and an alarm indication signal, defined in ITU-T Recommendation G. 70X and the ANSI SONET (Synchronous Optical NETwork) standard.

25. The hitless path switching method as claimed in claim 24, wherein said indicator for bit error checking is a B3 byte defined in ITU-T Recommendation G. 70X and the ANSI SONET standard.

26. The hitless path switching method as claimed in claim 24, wherein said indicator for bit error checking is a B2 byte defined in ITU-T Recommendation G. 70X and the ANSI SONET standard.

27. The hitless path switching method as claimed in claim 22, wherein each of said data blocks has said indicator for bit error checking at its beginning portion.

28. The hitless path switching method as claimed in claim 27, wherein a transferring timing of said switching control signal is immediately after said indicator for bit error checking.

29. The hitless path switching method as claimed in claim 28, further comprising the steps of detecting a failure occurring in said first path and said second path by monitoring said line signals, and switching said second path to said working path and said first path to said protection path regardless of a bit error occurrence, if a failure is detected at said first path when said first path is allotted to said working path and said second path is allotted to said protection path, and wherein said failure is denoted by an alarm signal selected from a group which includes a signal indicating a loss of signal, a signal indicating a loss of frame, and an alarm indication signal, defined in ITU-T Recommendation G. 70X and the ANSI SONET (Synchronous Optical NETwork) standard.

30. The hitless path switching method as claimed in claim 29, wherein said indicator for bit error checking is a B3 byte defined in ITU-T Recommendation G. 70X and the ANSI SONET standard.

31. The hitless path switching method as claimed in claim 29, wherein said indicator for bit error checking is a B2 byte defined in ITU-T Recommendation G. 70X and the ANSI SONET standard.

32. The hitless path switching method as claimed in claim 22, wherein said data blocks are VC (Virtual Container) frames defined in ITU-T Recommendation G. 70X.

33. The hitless path switching method as claimed in claim 32, wherein each of said data blocks is a data block of one frame length having at its beginning portion a B3 byte defined in ITU-T Recommendation G. 70X, and a transferring timing of said switching control signal is immediately after said B3 byte.

34. The hitless path switching method as claimed in claim 22, wherein said data blocks are one of STS SPE (Synchronous Transport Signal Synchronized Payload Environment) frames, and VT (virtual Tributary) SPE frames defined in the ANSI SONET standard.

35. The hitless path switching method as claimed in claim 34, wherein each of said data blocks is a data block of one frame length having at its beginning portion a B3 byte defined in the ANSI SONET standard, and said transferring timing is immediately after said B3 byte.

36. The hitless path switching method as claimed in claim 22, wherein said data blocks are STM (Synchronous Transport Module) frames defined in ITU-T Recommendation G. 70X.

37. The hitless path switching method as claimed in claim 36, wherein each of said data blocks is a data block of one frame length having at its beginning portion a B2 byte defined in ITU-T Recommendation G. 70X, and a transferring timing of said switching control signal is immediately after said B2 byte.

38. The hitless path switching method as claimed in claim 22, wherein said data blocks are STS frames defined in the ANSI standard.

39. The hitless path switching method as claimed in claim 38, wherein each of said data blocks is a data block of one frame length having at its beginning portion a B2 byte defined in the ANSI SONET standard, and a transferring timing of said switching control signal is immediately after said B2 byte.

40. The hitless path switching method as claimed in claim 22, wherein said data blocks are ATM (Asynchronous Transfer Mode) cells defined in ITU-T Recommendation I.432.

41. The hitless path switching method as claimed in claim 40, wherein said indicator for bit error checking is a HEC (Header Error Control) byte in said ATM cell.

42. The hitless path switching method as claimed in claim 40, wherein said indicator for bit error checking is obtained by performing bit interleave parity computation over all bits in a header area and an information area of said ATM cell.

\* \* \* \* \*